United States Patent
Kim et al.

(10) Patent No.: US 8,103,147 B2
(45) Date of Patent: Jan. 24, 2012

(54) RECORDING MEDIUM, METHOD AND APPARATUS FOR PROVIDING MANAGEMENT INFORMATION

(75) Inventors: Byungjin Kim, Kyunggi-do (KR); Kang-soo Seo, Kyunggi-do (KR); Jea-Yong Yoo, Seoul (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 1311 days.

(21) Appl. No.: 11/483,158

(22) Filed: Jul. 10, 2006

(65) Prior Publication Data

US 2006/0251393 A1 Nov. 9, 2006

Related U.S. Application Data

(63) Continuation of application No. 10/651,036, filed on Aug. 29, 2003, now Pat. No. 7,313,314, which is a continuation of application No. 10/232,706, filed on Sep. 3, 2002, now Pat. No. 6,925,247, which is a continuation of application No. 09/435,608, filed on Nov. 8, 1999, now Pat. No. 6,470,135.

(30) Foreign Application Priority Data

Nov. 8, 1998 (KR) .................................. 98-048096

(51) Int. Cl.
*H04N 9/80* (2006.01)
(52) U.S. Cl. ...................................... 386/241
(58) Field of Classification Search ............... 386/1, 46, 386/52–55, 68, 82, 95, 124–126
See application file for complete search history.

(56) References Cited

U.S. PATENT DOCUMENTS

| | | | |
|---|---|---|---|
| 5,455,684 A | 10/1995 | Fujinami et al. | |
| 5,535,008 A | 7/1996 | Yamagishi et al. | |
| 5,621,840 A | 4/1997 | Kawamura et al. | |
| 5,740,307 A | 4/1998 | Lane | |
| 5,832,085 A | 11/1998 | Inoue et al. | |
| 5,859,949 A | 1/1999 | Yanagihara | |
| 5,870,523 A | 2/1999 | Kikuchi et al. | |
| 5,991,502 A * | 11/1999 | Kawakami et al. | 386/109 |
| 6,002,834 A | 12/1999 | Hirabayashi et al. | |
| 6,016,382 A | 1/2000 | Yamagishi et al. | |
| 6,028,726 A | 2/2000 | Yanagihara | |
| 6,065,050 A | 5/2000 | DeMoney | |
| 6,078,727 A * | 6/2000 | Saeki et al. | 386/125 |
| 6,115,531 A | 9/2000 | Yanagihara | |

(Continued)

FOREIGN PATENT DOCUMENTS

JP 7212768 8/1995

(Continued)

*Primary Examiner* — William C Vaughn, Jr.
*Assistant Examiner* — Heather Jones
(74) *Attorney, Agent, or Firm* — Birch, Stewart, Kolasch & Birch, LLP (57) ABSTRACT

According to one embodiment, a method of recording a digital stream on a recording medium, includes checking an existence of entry point information in a received digital transport stream, the entry point information associated with entry points in the digital transport stream, the digital transport stream comprising a plurality of data packets; grouping received data packets into one or more data object units based on the entry point information as a result of the checking step, and grouping one or more data object units into one data object; and recording the received data packets on the basis of the data object on the recoding medium.

39 Claims, 6 Drawing Sheets

| U.S. PATENT DOCUMENTS | | | |
|---|---|---|---|
| 6,229,801 B1 | 5/2001 | Anderson et al. | |
| 6,282,320 B1 | 8/2001 | Hasegawa et al. | |
| 6,466,733 B1 | 10/2002 | Kim | |
| 6,470,135 B1 | 10/2002 | Kim et al. | |
| 6,925,247 B2 | 8/2005 | Kim et al. | |

| FOREIGN PATENT DOCUMENTS | | |
|---|---|---|
| JP | 8163496 | 6/1996 |
| JP | 9322111 | 12/1997 |
| JP | 10243352 | 9/1998 |

* cited by examiner

*Conventional Art*

RECORDING MEDIUM, METHOD AND APPARATUS FOR PROVIDING MANAGEMENT INFORMATION

CROSS-REFERENCE

This present application is a continuation of U.S. patent application Ser. No. 10/651,036 filed on Aug. 29, 2003, now U.S. Pat. No. 7,313,314, which is a continuation of U.S. patent application Ser. No. 10/232,706, filed on Sep. 3, 2002, now issued as U.S. Pat. No. 6,925,247B2 on Aug. 2, 2005, for which priority is claimed under 35 U.S.C. §120, which is a continuation of U.S. patent application Ser. No. 09/435,608, filed on Nov. 8, 1999, now issued as U.S. Pat. No. 6,470,135 on Oct. 22, 2002; and this present application claims priority of Patent Application No. 98-48096, filed in Korea on Nov. 8, 1998, under 35 U.S.C. §119. The entire contents of each of these applications are herein fully incorporated by reference.

BACKGROUND OF THE INVENTION

1. Field of the Invention

The present invention relates to a method and apparatus for recording received digital data streams on a recording medium and creating and recording management information pertaining to the recorded digital data streams.

2. Description of the Related Art

In conventional analog television broadcast systems, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

In digital broadcast, a plurality of programs encoded based upon the MPEG format are multiplexed into a transport stream which is then transmitted. The transmitted transport stream is received by a set top box at the receiver and demultiplexed into a plurality of programs. If a program is chosen from the demultiplexed programs, the chosen program is decoded by a decoder in the set top box and original audio and video signals are retrieved. The retrieved audio and video signals can be presented by an A/V output apparatus such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by a set top box can be stored in a streamer such as a digital video disk (DVD) recording apparatus after being transmitted through communication interfaces like an IEEE-1394 serial bus. Later, the stored digital data stream can be edited and transmitted back to the set top box so that the stored original digital audio and video data can be presented.

For the above-mentioned systems, it is necessary to develop a method for recording a received digital data stream on a recording medium by partitioning the received data stream into minimum presentation units, each minimum presentation unit being a data decoding unit. Unless the recorded data stream maps to random-accessible minimum presentation units, the initial reproduction of the recorded stream after search operations may be imperfect.

SUMMARY OF THE INVENTION

Accordingly, it is an object of the present invention to provide a recording medium, method and apparatus for providing management information pertaining to recorded digital data streams.

A method for providing management information in accordance with an embodiment of the present invention includes grouping data of a digital data stream into a plurality of object units, and creating map information for accessing the data, wherein the map information includes time information and object unit information associated with the object units.

A recording medium for providing management information in accordance with an embodiment of the present invention includes a plurality of object units stored on the recording medium, the object units representing groups of data of a digital data stream, and map information stored on the recording medium for accessing the data, wherein the map information includes time information and object unit information associated with the object units.

An apparatus for providing management information according to an embodiment of the invention, includes elements for grouping data of a digital data stream into a plurality of object units and for creating map information for accessing the data, wherein the map information includes access time information and object unit information associated with the object units.

According to another aspect of the present invention, there is provided a method of recording a digital stream on a recording medium, comprising: checking an existence of entry point information in a received digital transport stream, the entry point information associated with entry points in the digital transport stream, the digital transport stream comprising a plurality of data packets; grouping received data packets into one or more data object units based on the entry point information as a result of the checking step, and grouping one or more data object units into one data object; and recording the received data packets on the basis of the data object on the recoding medium.

According to another aspect of the present invention, there is provided a method of recording a digital stream on a recording medium, comprising: checking a data packet with entry point information in a received digital transport stream, the entry point information being required for accessing a specific position, the digital transport stream comprising a plurality of data packets; grouping received data packets into one stream object unit (SOBU) with reference to the data packet with the entry point information as a result of the checking step, and grouping one or more stream object units into stream object (SOB); and recording the received data packets according to the stream object (SOB) on the recoding medium.

According to another aspect of the present invention, there is provided a method of recording a digital stream on a recording medium, comprising: checking whether an entry point information in a received digital stream is found within a predetermined time; grouping received data packets into a first data unit with reference to the predetermined time if the entry point information is not found within the predetermined time; and recording the received data packets included in the first data unit on the recording medium.

According to another aspect of the present invention, there is provided an apparatus for recording a digital stream on a recording medium, comprising: a formatter grouping received data packets of a digital transport stream into one or more data object units based on an entry point information and grouping one or more data object units into one data object, wherein the entry point information is associated with entry points in the digital transport stream; and a controller detecting an entry point information in the received digital transport stream, controlling the formatter to group the data packets into a data object based on the detected entry point information, and controlling a recording of the received data packets on the basis of the data object on the recoding medium.

According to another aspect of the present invention, there is provided a storage medium comprising a data structure, the data structure comprising a stream object including one or more stream object units, the stream object unit including one or more data packets, wherein the stream object unit includes a first stream object unit partitioned on a basis of an entry point information, and a second stream object unit partitioned on a basis of data packets present within a predetermined time.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
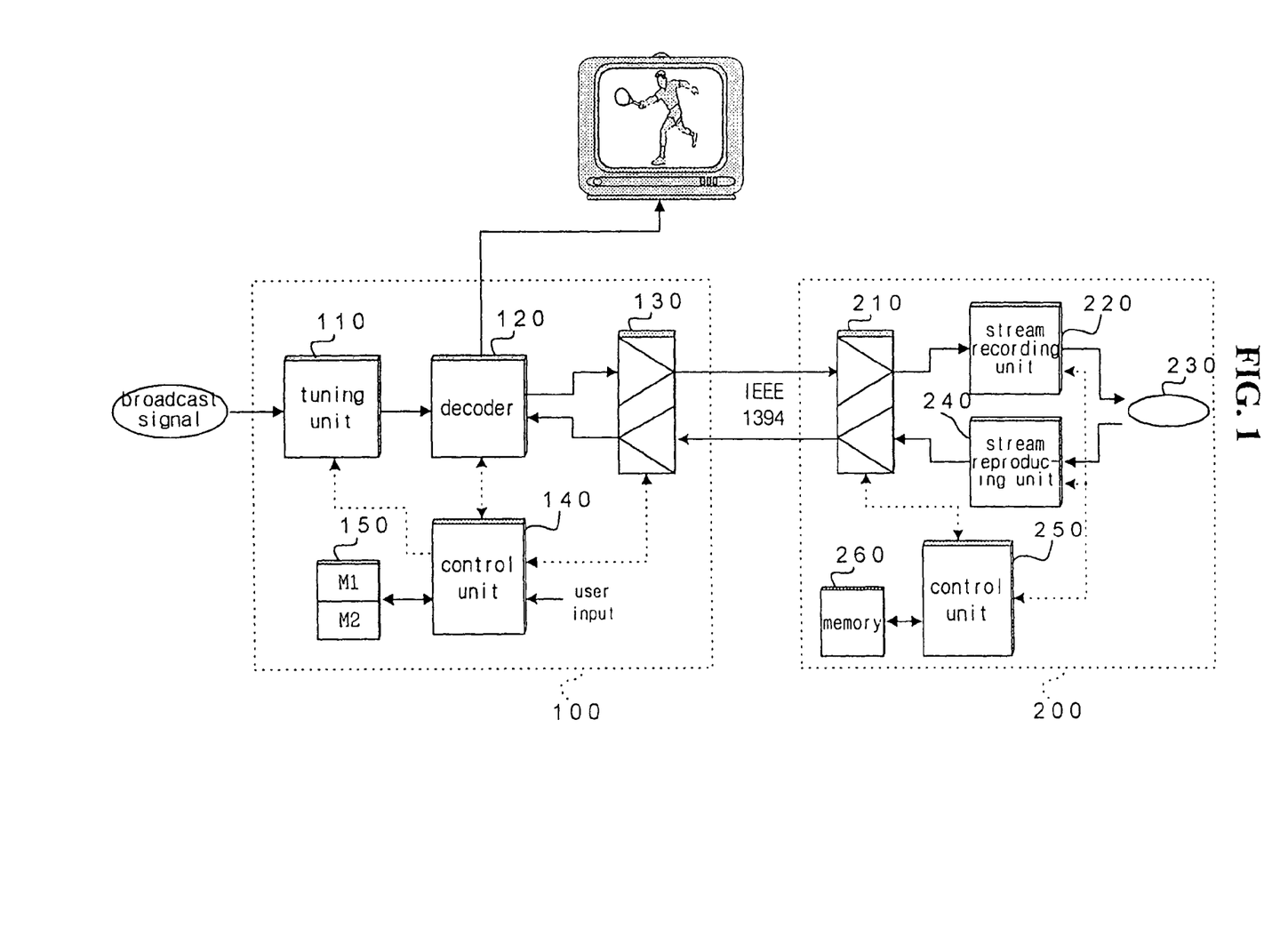
FIG. 1 is a block diagram of an apparatus in which the present invention may be advantageously practiced.

FIG. 1 depicts a block diagram of an apparatus in which the present invention may be practiced according to an embodiment of the invention. The apparatus includes a set top box 100, a communication interface (e.g., IEEE-1394), and a streamer 200, all operatively coupled.

The set top box 100 receives transport streams encoded by system encoders and transmitted by a plurality of broadcast stations and demultiplexes the received transport streams. After a system decoder 120 decodes the transport stream of a program tuned by a tuning unit 110, a control unit 140 outputs the decoded transport stream to an A/V output device such as a TV set for presentation.

The set top box 100 may transmit a program chosen by a user to the streamer 200 through an interface such as the IEEE-1394 interface so that the transmitted program is recorded on a recording medium 230 such as a digital video disk by the streamer 200.

In addition, as requested by a user, the set top box 100 may receive a program retrieved from the recording medium 230 by the streamer 200 through the IEEE-1394 communication interface so that the received program can be presented on a TV set after being decoded by the decoder 120.

Figure 2:
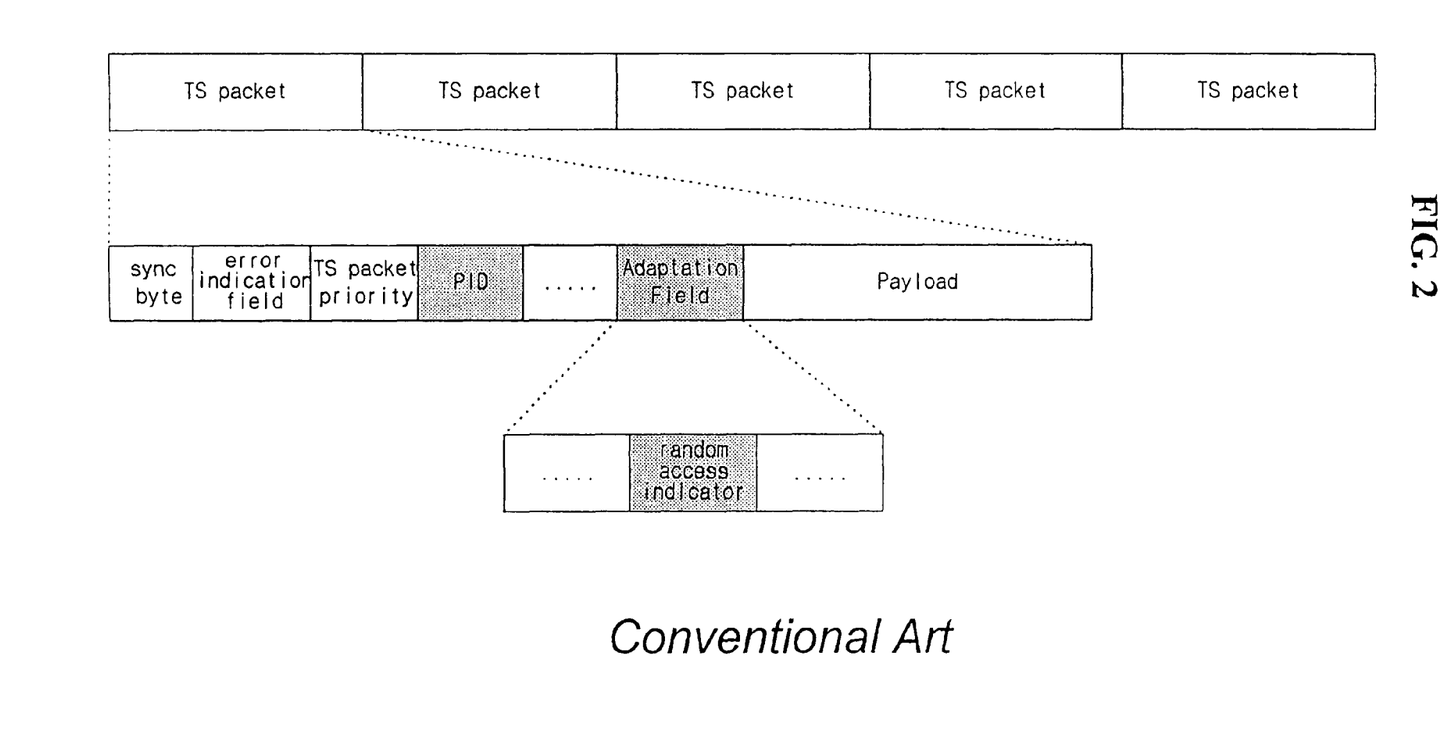
FIG. 2 is a pictorial representation showing the syntax of a digital data stream.

A transport stream packet of a program stream, as shown in, e.g., FIG. 2, includes a packet header and a payload, the packet header containing fields of a 8-bit sync byte, an error indication field indicative of a possible error of the packet, a PID showing attributes of the data contained in the payload, and an adaptation field. The adaptation field contains various information on the properties of the data stream, such as a random access indicator indicating the start of a video sequence header which is a random access entry point.

Figure 3:
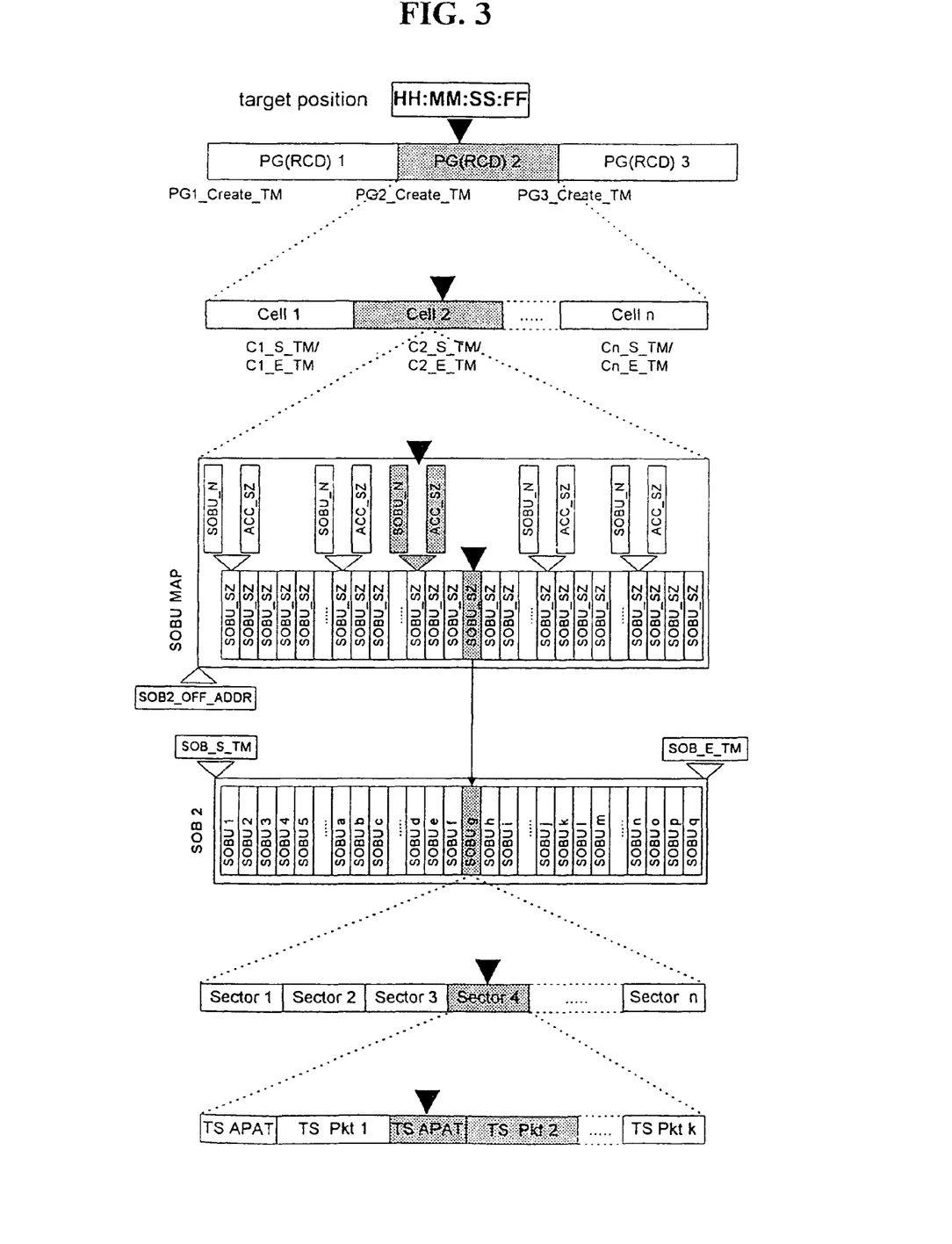
FIG. 3 is a pictorial representation showing the syntax of the recorded data and the management information pertaining to the recorded data created by an embodiment of the present invention.

The method for recording digital data streams in accordance with an embodiment of the present invention will now be described with reference to FIGS. 1 and 3.

If a user's request for recording an incoming data stream tuned by the tuning unit 110 has been received, the control unit 140 of the set top box 100 informs a control unit 250 of the streamer 200 that a recording mode is set and begins to transfer the received digital stream to the streamer 200 through the interface such as the IEEE-1394 interface. The control unit 250 of the streamer 200 controls a stream recording unit 220 to record the received data stream on the recording medium 230. The transport stream packets (TS Pkt 1~TS Pkt k) constituting the data stream are recorded on the recording medium 230 along with respective transport stream packet arrival times (TS APATs), wherein the transport stream packets with packet arrival times are organized in sectors on the recording medium 230.

Concurrently, the control unit 250 of the streamer 200 detects the random access indicator contained in a transport stream packet header. If a random access indicator is detected, previously received transport stream packets and the transport stream packet having the random access indicator are grouped into a stream object unit (SOBU). Likewise, transport stream packets received after the transport stream packet having the random access indicator and a transport stream packet having the next random access indicator are grouped into another stream object unit (SOBU). In this manner, the received data stream is recorded on the recording medium as a series of stream object units (SOBU 1~SOBU q) as shown in FIG. 3. A stream object unit presentation time (SOBU_TM) and a stream object unit size (SOBU_SZ) are created for each stream object unit (SOBU) and recorded as management information pertaining to the associated stream object unit, where the stream object unit size (SOBU_SZ) is expressed in terms of the number of sectors in which the associated stream object unit (SOBU) is recorded. As shown in FIG. 3, the specific location of a desired SOBU (e.g., SOBU g) can be identified using the stream object unit size (SOBU_SZ), such that the SOBU_SZ can be considered location information.

If a predetermined number, for example 20, of stream object units (SOBUs) are created by repeating the grouping task, the control unit 250 creates and records a stream object unit index number (SOBU_N), an accumulated presentation time (ACC_TM), and an accumulated size (ACC_SZ) for the 20 stream object units. The accumulated presentation time (ACC_TM) and accumulated size (ACC_SZ) for each of 20 stream object units are the presentation time and size accumulated from the start position (SOB2_OFF_ADDR) of the stream object (SOB2) containing the associated stream object units to each of 20 stream object units, respectively. In this aspect, ACC_SZ can be considered location information.

After the recording mode ends, the control unit 250 of the streamer 200 groups the created stream object units (SOBUs) into a stream object (SOB) and groups the recorded accumulated sizes (ACC_SZs) and stream object unit sizes (SOBU_SZs) into a map. The map is stored in the management information area of a memory 260 as stream object information (SOBI).

Subsequently, the control unit 250 of the streamer 200 creates a presentation sequence information (Cell) concerning the map and stores the cell as the presentation sequence information corresponding to the created record (RCD) or program (PG) in the management information area of the memory 260.

The method for a time search operation by a user will now be explained by assuming that digital data streams are recorded on the recording medium by the aforementioned method.

If a user enters a search time (HH:MM:SS:FF) in order to search for a specific position on the recording medium 230, the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, . . . , Cn_S_TM) and presentation end time (C1_E_TM, C2_E_TM, . . . , Cn_E_TM) of each Cell contained in the detected program PG2.

Referring to the stream object information (SOBI) of the stream object SOB2 associated with the detected presentation sequence information Cell 2, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM). Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry).

The control unit 250 controls a stream reproducing unit 240 to reproduce transport stream packets from the first sector (Sector 1) in which the detected target stream object unit (SOBUg shown in FIG. 3) is recorded and transmit the reproduced transport stream packets to the set top box 100 through the IEEE-1394 interface. The decoding operation, therefore, is performed from the transport stream packet having a random access indicator, which means video data is reproduced from the Intra-picture and audio data is reproduced from the first bye of a frame.

Figure 4A:
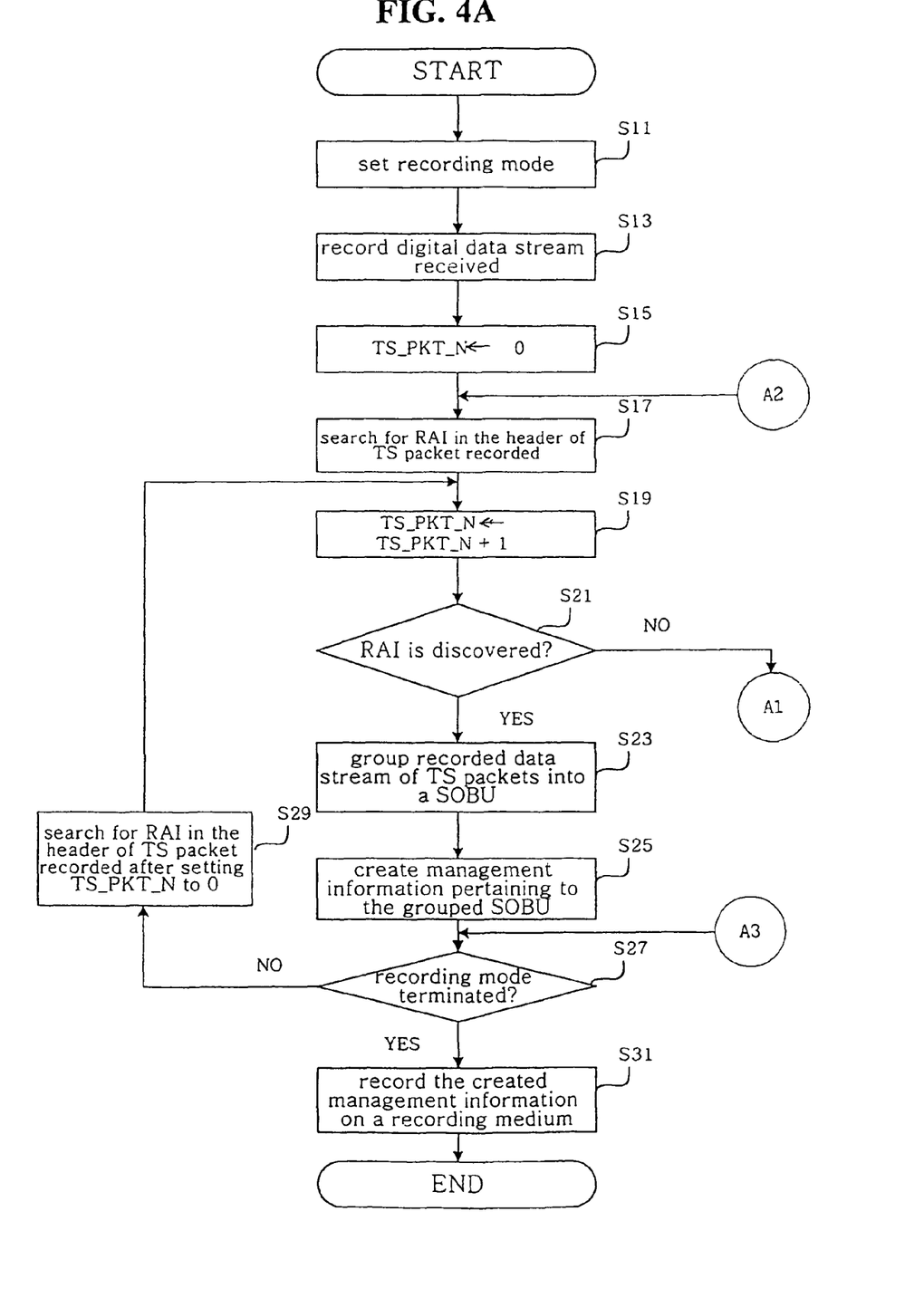
FIGS. 4A and 4B are flow diagrams of the method for recording digital data streams according to an embodiment of the present invention.
Figure 4B:
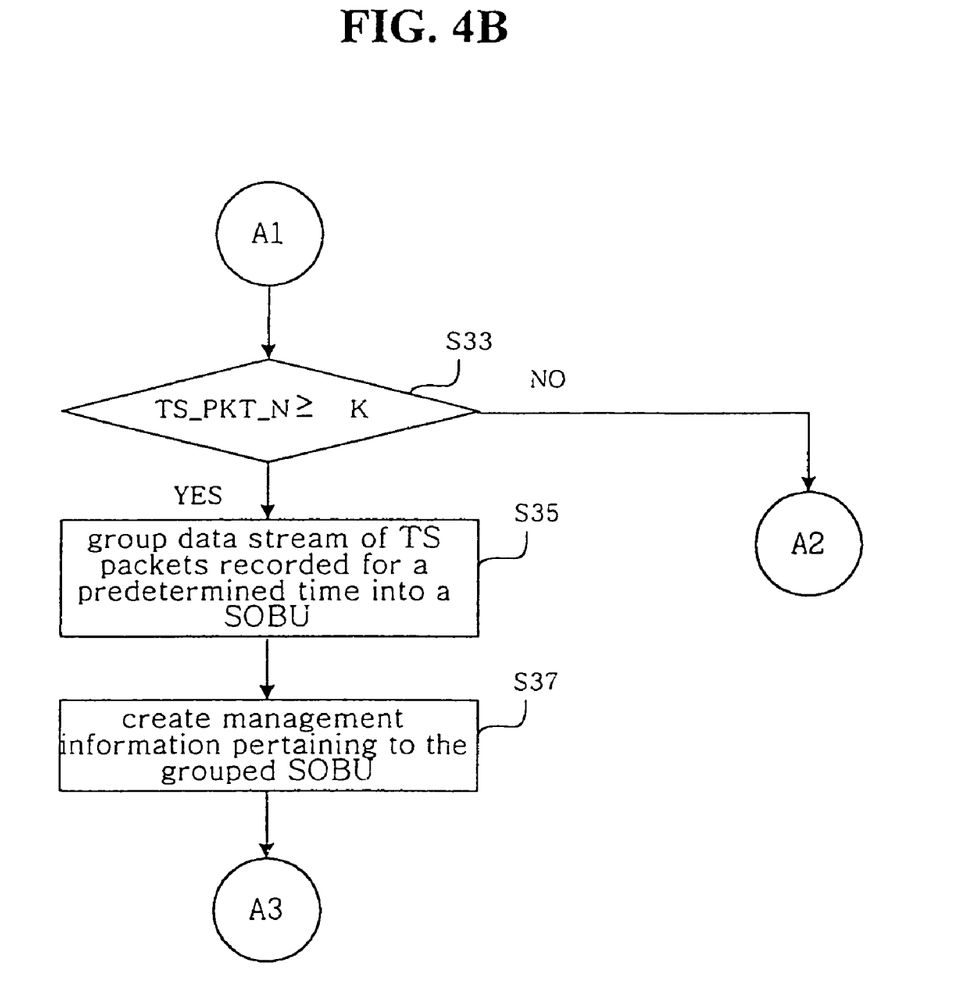

The method for recording digital data streams in accordance with an embodiment of the present invention will be described with reference to the flow diagrams shown in FIGS. 4A and 4B.

If a user's request for recording an incoming data stream tuned by the tuning unit 110 has been received, the control unit 140 of the set top box 100 informs the control unit 250 of the streamer 200 that a recording mode is set and begins to transfer the received digital stream to the streamer 200 through the IEEE-1394 interface (S11).

The control unit 250 of the streamer 200 controls the stream recording unit 220 to record the data stream received through the IEEE-1394 interface on the recording medium 230 (S13). The transport stream packets (TS Pkt~TS Pkt k) constituting the data stream are recorded on the recording medium 230 along with respective transport stream packet arrival times (TS APATs), wherein the transport stream packets with packet arrival times are organized in sectors on the recording medium 230.

Subsequently, the control unit 250 resets an internal register for storing the number of transport stream packets (TS_Pkt_N) to zero (S15) and searches for a random access indicator (RAI) in the header of the first transport stream packet of the input data stream (S17). And the control unit 250 increments the internal register value indicative of the number of transport stream packets (TS_Pkt_N) by 1 (S19) and checks if a random access indicator has been discovered in step S17 (S21).

In the instance where the existence of a random access indicator is confirmed in step S21, the transport stream packets received up to the transport stream packet having the random access indicator are grouped into a stream object unit (SOBU) as discussed above (S23). Likewise, transport stream packets received after the transport stream packet having the random access indicator and the transport stream packet having the next random access indicator are grouped into another stream object unit (SOBU).

If a stream object unit is created, the control unit 250 creates a stream object unit presentation time (SOBU_TM) and a stream object unit size (SOBU_SZ) for the stream object unit (SOBU) and stores such map information in the management information area of the memory 260 as management information regarding the stream object unit (SOBU).

The control unit 250 checks whether a request for terminating the recording mode has been received (S27) during the recording mode. If it is not received, the control unit 250 continues to search for a random access indicator in the input data stream and initializes the number of transport stream packets (TS_Pkt_N) (S29). And the flow returns to step S19.

If the terminating command is received, the control unit 250 reads the management information stored in the management information area of the memory 260 and records the management information in the management information area of the recording medium 230 before terminating the recording mode (S31).

After the recording mode ends, the control unit 250 of the streamer 200 groups the created stream object units (SOBUs) into a stream object (SOB), and groups the recorded accumulated sizes (ACC_SZs), which have been generated during the recording mode as in the aforementioned embodiment, and stream object unit sizes (SOBU_SZs) into a map. The map is stored in the management information area of the memory 260 as stream object information (SOBI). In addition, the control unit 250 also creates presentation sequence information for the grouped stream object and records it as cell information for the stream object.

Additionally, the control unit 250 sets the value of a stream object unit grouping type indication flag contained in the stream object information (SOBI) to 1 for indicating that stream object units constituting the stream object are created based upon the random access indicator.

The value of the stream object unit grouping type indication flag implies that the stream object unit (SOBU) is created so that it is randomly accessible and thus the stream object unit (SOBU) is the basic group for a trick-play which means data-discrete reproduction. This fact also means that the stream object unit (SOBU) contains a random access entry point.

Stream object units can be created in many different ways. For example, it is possible to generate stream object units of a predetermined size without regard to the random access indicator. If a random access indicator is detected from a stream object unit, a flag indicative of the fact can be set to 1 for the stream object unit (SOBU) and recorded on the recording medium.

To be more specific, an n-bit data is created for a stream object including n stream object units (SOBU1~SOBUn) and each bit of the data is associated with each stream object unit. Then, it can be examined whether a stream object unit (SOBU) has a random access indicator by simply checking the associated bit value.

In the meantime, if it is verified that a random access indicator is not discovered in step S21, the control unit 250 checks if the number of transport stream packets (TS_PKT_N) stored in the internal register is greater than a predetermined value K (S33). If not, the flow returns to step S17 and continues the aforementioned procedure.

The value K is determined in consideration of the minimum transfer rate of a data stream. For example, suppose that the desirable minimum time length of a stream object unit (SOBU) is 0.5 s (seconds) and the minimum transfer rate of an input data stream is 3 Mbps. In this case, the size of data received for 0.5 s exceeds 1875000 bytes and more than 997 transport stream packets are received for 0.5 s with each transport stream packet having 188 bytes. Considering the number of transport stream packets received for 0.5 s, it is desirable to set the value K greater than 997. It is because at least one packet among 997 transport stream packets should have a random access indicator if the data stream is supposed to contain random access indicators.

If the number of transport stream packets (TS PKT_N) stored in the internal register is greater than the predetermined value K in step S33, the control unit 250 decides that random access indicators were not inserted into the data stream when the data stream was transmitted by the associated broadcast station. The flow continues to step S35.

With reference to time information contained in the transport stream packets, the control unit 250 records the received transport stream packets by grouping them into stream object units, with each stream object unit (SOBU) having a fixed time length, for example, 0.5 s (S35). Also, the control unit 250 creates a stream object unit size (SOBU_SZ) and a stream object unit presentation time (SOBU_TM) for each stream object unit (SOBU) and records the created information as management information for the associated stream object unit (SOBU) (S37). The stream object unit size (SOBU_SZ) of a stream object unit (SOBU) is expressed in terms of the number of sectors containing the stream object unit. If 20 stream object units (SOBUs) are created after 10 s elapses, the control unit 250 creates and records a stream object unit index number (SOBU_N), an accumulated presentation time (ACC_TM), and an accumulated size (ACC_SZ) for each stream object unit (SOBU). The accumulated presentation time (ACC_TM) and accumulated size (ACC_SZ) of a stream object unit are the presentation time and size accumulated from the start position (SOB2_OFF_ADDR) of the stream object (SOB2) containing the stream object unit to the stream object unit, respectively.

After the recording mode ends, the control unit 250 groups the created stream object units (SOBUs) into a stream object (SOB) and groups the recorded accumulated sizes (ACC_SZs) and stream object unit sizes (SOBU_SZs) into a map. The map is stored in the management information area of the memory 260 as stream object information (SOBI).

At this time, the control unit 250 sets the stream object unit grouping type indication flag contained in the stream object information (SOBI) to zero to inform that stream object units (SOBUs) constituting the stream object (SOB) have not been generated based upon random access indicators but generated based upon time.

Subsequently, the control unit 250 of the streamer 200 creates a presentation sequence information (Cell) concerning the map and stores it in the management information area of the memory 260 as the presentation sequence information corresponding to the record (RCD) or program (PG) which has been created by a single recording operation.

The control unit 250 checks whether a request for terminating the recording mode has been received (S39). If so, the flow branches to step S31 wherein the management information (e.g., structure shown in FIG. 3 and discussed above) stored in the management information area of the memory 260 is recorded in the management information area of the recording medium 230 and the recording mode terminates. If not, the flow returns to step S35 to the aforementioned recording procedure.

If a user sets a time search mode in order to search for specific data recorded on the recording medium by the above-mentioned method described with reference to FIGS. 4A and 4B, the search operation begins. A detailed explanation about the search operation will be given below with reference to FIGS. 3 and 5 according to an embodiment of the present invention.

Figure 5:
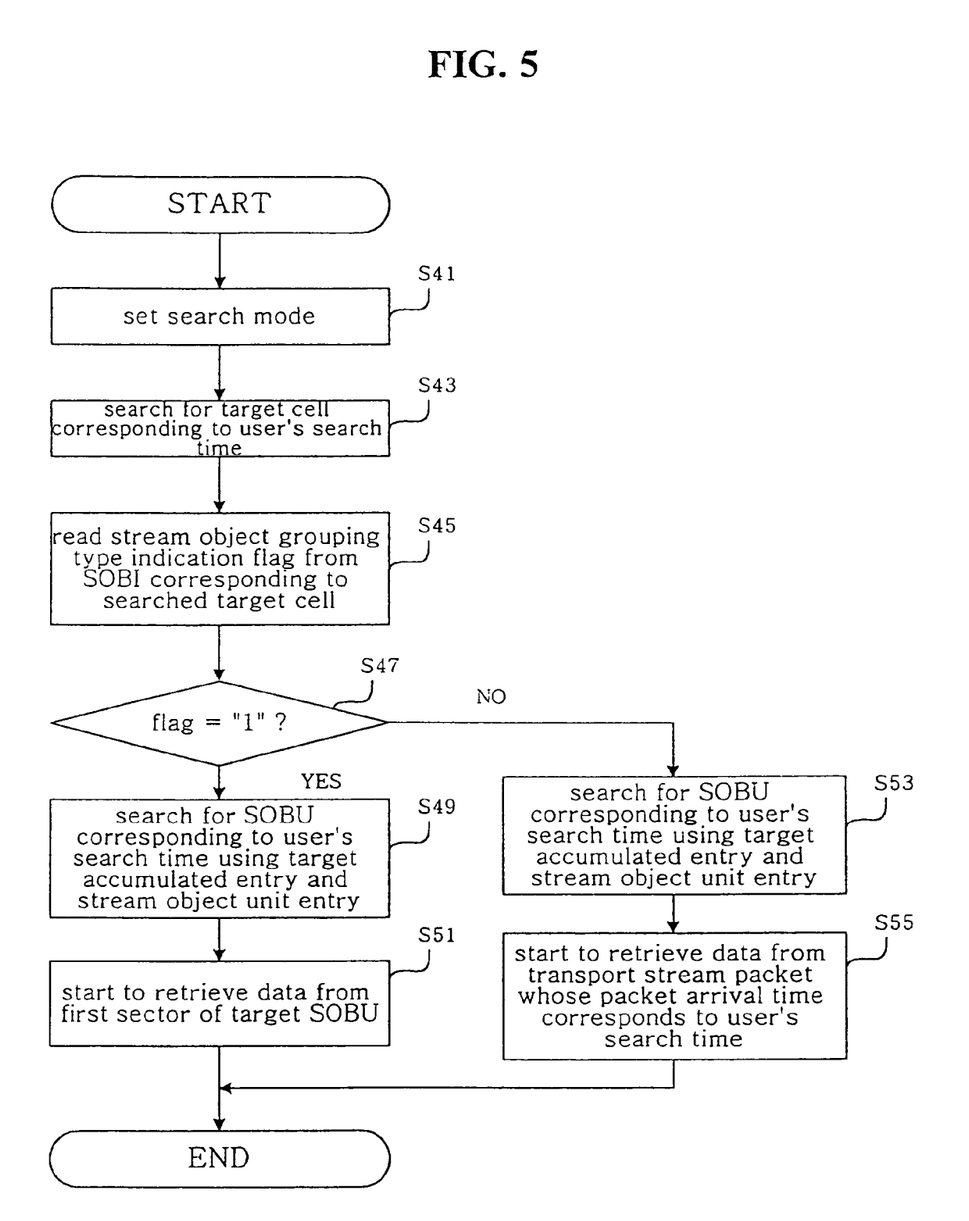
FIG. 5 is a flow diagram of the method for searching a digital data stream recorded by an embodiment of the present invention.

If a user enters a search time (HH:MM:SS:FF) in order to search for a specific position on the recording medium 230 (S41), the control unit 250 of the streamer 200 looks for a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 3. Then, the control unit 250 looks for a Cell (Cell 2 shown in FIG. 3) corresponding to the user's search time (HH:MM:SS:FF) with reference to the presentation start time (C1_S_TM, C2_S_TM, . . . , Cn_S_TM) and presentation end time (C1_E_TM, C2_E_TM, . . . , Cn_E_TM) of each Cell contained in the detected program PG2 (S43).

Next, the control unit 250 reads stream object unit grouping type indication flag from the stream object information (SOBI) of the stream object SOB 2 corresponding to the detected Cell 2 (S45) and checks if the flag is 1 (S47). The flag value "1" indicates that stream object units constituting the stream object SOB 2 have been created based on random access indicators (S47).

If it is confirmed in step S47 that the flag is 1, the control unit 250 searches for a stream object unit (SOBUg in FIG. 3) corresponding to the user's search time as explained with reference to FIG. 3 (S49) and controls the stream reproducing unit 240 so that reproduction of recorded data begins from the packets located in the first sector (Sector 1) containing the stream object unit SOBUg and the retrieved data can be transferred to the set top box 100 through the interface such as the IEEE-1394 interface 210 (S51).

If it is confirmed in step S47 that the flag is not 1, the control unit 250 detects a target accumulated entry (ACC Entry, the entry shaded in FIG. 3) containing the accumulated presentation time (ACC_TM) which is closest to the difference between the user's search time (HH:MM:SS:FF) and the stream object start time (SOB_S_TM) with reference to the stream object information (SOBI) of the stream object SOB2 associated with the detected presentation sequence information Cell 2. Lastly, the control unit 250 detects a stream object unit (SOBU) corresponding to the stream object unit presentation time (SOBU_TM) of the stream object unit containing the user's search time (HH:MM:SS:FF) by accumulating stream object unit presentation times (SOBU_TMs) from the stream object unit pointed to by the detected accumulated entry (ACC Entry). The target stream object unit (SOBU) can be located by adding the accumulated size (ACC_SZ) of the target accumulated entry (ACC Entry) to the sum of stream object sizes (SOBU_SZs) calculated from the stream object unit pointed to by the target accumulated entry (ACC Entry) (S53).

As a next step, the control unit 250 detects the transport stream packet arrival time (TS APAT) of each transport stream packet from the first Sector 1 containing the detected stream object unit SOBUg and compares the packet arrival time with the user's search time (HH:MM:SS:FF). The control unit 250 starts to retrieve recorded data from the transport stream packet whose packet arrival time is after the user's search time and controls the stream reproducing unit 240 so that the retrieved data can be transferred to the set top box 100 through the IEEE-1394 interface 210 (S55).

The invention may be embodied in other specific forms. For example, the invention is not only applicable to the apparatus shown in FIG. 1 but applicable to any system including a subsystem functioning as a set top box, another subsystem functioning as streamer, and a communication interface between the two systems.

In the previous embodiments, the random access indicators contained in the received data stream were detected by the control unit of the streamer. It is also possible, however, for the control unit of the set top box to detect the random access indicators and transmit the detected random access indicators to the streamer through the IEEE-1394 interface. In this case, the control unit of the set top box detects random access indication information for each transport stream packet and adds a flag indicative of the existence of the random access indication information during time stamping of the associated transport stream packet. The control unit of the streamer checks the flag and determines the method for creating stream object units depending on the flag value.

According to the present invention, random access information contained in a received digital data stream is detected and stream object units are created based upon the detected random access information, which enables reproduction of recorded data to start from the transport stream packet having the random access information and prevents imperfect data reproduction after track seek or time seek operations.

Also, the received digital data stream is recorded on a recording medium by partitioning the received data stream into random-accessible minimum presentation units or presentation units of a fixed time length depending upon the existence of random access indication information, thereby not limiting the usage of the apparatus.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording a digital stream on a recording medium, comprising:
    creating type information indicating whether entry point information in a received digital transport stream exists or not, the entry point information associated with entry points in the digital transport stream, the received digital transport stream comprising a plurality of data packets;
    grouping the plurality of data packets of the received digital transport stream into one or more data object units based on the entry point information, and grouping the one or more data object units into one data object; and
    recording the plurality of data packets of the received digital transport stream based on the one data object on the recording medium.

2. The method of claim 1, wherein the creating step checks whether the entry point information exists within a predetermined time.

3. The method of claim 2, the step of grouping further comprising:
    grouping the plurality of data packets of the received digital transport stream with reference to the predetermined time into the one data object if the entry point information does not exist within the predetermined time.

4. The method of claim 1, wherein the received digital transport stream includes video data, and the entry point information indicates an access point of a specific video data.

5. The method of claim 4, wherein the specific video data is an Intra (I) picture.

6. The method of claim 1, wherein the grouping step groups the plurality of data packets of the received digital transport stream into one or more packet groups, the one or more packet groups into one or more data object units, and the one or more data object units into the one data object.

7. The method of claim 1, wherein the type information is configured to identify whether the plurality of data packets of the received digital transport stream are grouped into the one or more data object units based on a predetermined time period and based on the entry point information included in the received digital transport stream.

8. A method of recording a digital stream on a recording medium, comprising:
    creating type information indicating whether or not a data packet in a received digital transport stream includes entry point information, the entry point information configured to access a specific position, the received digital transport stream comprising a plurality of data packets;
    grouping the plurality of data packets of the received digital transport stream into one stream object unit (SOBU) with reference to the data packet with the entry point information, and grouping one or more stream object units into a stream object (SOB); and
    recording the plurality of data packets of the received digital transport stream according to the stream object (SOB) on the recording medium.

9. The method of claim 8, wherein the creating step checks whether the data packet with the entry point information exists within a predetermined time.

10. The method of claim 9, the step of grouping further comprising:
grouping the plurality of data packets of the received digital transport stream within the predetermined time into the one SOBU if the data packet with the entry point information does not exist within the predetermined time.

11. The method of claim 8, wherein the received digital transport stream includes video data, and the entry point information indicates an access point of a specific video data.

12. The method of claim 11, wherein the specific video data is an Intra (I) picture.

13. The method of claim 8, wherein the grouping step groups the plurality of data packets of the received digital transport stream into one or more packet groups, the one or more packet groups into the one SOBU, and one or more SOBUs into the SOB.

14. The method of claim 8, wherein the type information indicates whether the plurality of data packets of the received digital transport stream are grouped into the one SOBU based on a predetermined time period or based on the entry point information included in the digital transport stream.

15. A method of recording a digital stream on a recording medium, comprising:
creating type information indicating whether entry point information in a received digital stream exists or not and whether data packets of the received digital stream are to be grouped into a first data unit based on a predetermined time period or the entry point information;
grouping the data packets of the received digital stream into the first data unit with reference to the predetermined time if the entry point information is not found within the predetermined time; and
recording the data packets included in the first data unit on the recording medium.

16. The method of claim 15, wherein the creating step checks the entry point information in a recording mode for recording the digital stream with reference to the entry point information.

17. The method of claim 16, wherein the entry point information indicates an access point of a specific data.

18. The method of claim 15, wherein the first data unit is a stream object unit (SOBU).

19. The method of claim 18, wherein the grouping step groups one or more SOBUs into the stream object (SOB).

20. The method of claim 15, wherein the grouping step groups the data packets of the received digital stream into a second data unit with reference to the entry point information.

21. An apparatus for recording a digital stream on a recording medium, comprising:
a formatter configured to group data packets of a received digital transport stream into one or more data object units based on entry point information, and group the one or more data object units into one data object; and
a controller configured to
determine whether the entry point information exists or not in the received digital transport stream,
control the formatter to group the data packets of the received digital transport stream into the one data object based on the entry point information, and
control a recording of the data packets of the received digital transport stream on the recording medium based on the one data object.

22. The apparatus of claim 21, wherein the controller checks whether the entry point information exists within a predetermined time.

23. The apparatus of claim 22, wherein the controller controls the formatter to group the data packets of the received digital transport stream within the predetermined time into the one data object if the entry point information does not exist within the predetermined time.

24. The apparatus of claim 21, wherein the received digital transport stream includes video data, and the entry point information indicates an access point of a specific video data.

25. The apparatus of claim 24, wherein the specific video data is an Intra (I) picture.

26. The apparatus of claim 21, wherein the formatter groups the received data packets of the received digital transport stream into one or more packet groups, the one or more packet groups into one or more data object units, and the one or more data object units into the one data object.

27. The apparatus of claim 21, wherein the type information indicates whether the data packets of the received digital transport stream are grouped into the one or more data object units based on a predetermined time period or based on the entry point information included in the digital transport stream.

28. A non-transitory computer-readable storage medium encoded with a data structure of a received digital transport stream, the data structure configured to enable a device to record or reproduce information, the data structure comprising a stream object including one or more stream object units, each stream object unit including one or more data packets,
wherein the one or more stream object units includes type information indicating whether or not entry point information in the received digital transport stream exists,
wherein the one or more stream object units also includes a first stream object unit partitioned based on the entry point information, and a second stream object unit partitioned based on data packets present within a predetermined time.

29. The non-transitory computer-readable storage medium of claim 28, wherein the entry point information indicates an access point of a specific video data, the specific video data being an Intra (I) picture.

30. A method of reproducing a digital stream from a recording medium, comprising:
reproducing, from the recording medium, a plurality of data packets of a digital transport stream that have been recorded onto the recording medium based on a data object that includes one or more data object units, the plurality of data packets having been grouped into the one or more data object units based on entry point information included in the digital transport stream,
wherein the digital transport stream includes type information indicating whether the entry point information exists or not.

31. The method of claim 30, wherein the plurality of data packets are grouped into the one or more data object units with reference to a predetermined time if the entry point information does not exist within the predetermined time.

32. The method of claim 30, wherein the digital transport stream includes video data, and the entry point information indicates an access point of a specific video data.

33. The method of claim 32, wherein the specific video data is an Intra (I) picture.

34. The method of claim 30, wherein the type information indicates whether the plurality of data packets of the digital transport stream are grouped into the one or more data object units based on a predetermined time period or based on the entry point information included in the digital transport stream.

35. An apparatus configured to reproduce a digital stream from a recording medium, comprising:

a stream reproducing unit configured to reproduce, from the recording medium, a plurality of data packets of a digital transport stream that have been recorded onto the recording medium based on a data object that includes one or more data object units, the plurality of data packets having been grouped into the one or more data object units based on entry point information included in the digital transport stream, wherein the digital transport stream includes type information indicating whether the entry point information exists or not.

36. The apparatus of claim 35, wherein the plurality of data packets are grouped into the one or more data object units with reference to a predetermined time if the entry point information does not exist within the predetermined time.

37. The apparatus of claim 35, wherein the digital transport stream includes video data, and the entry point information indicates an access point of a specific video data.

38. The apparatus of claim 37, wherein the specific video data is an Intra (I) picture.

39. The apparatus of claim 35, wherein the type information indicates whether the received data packets are grouped into the one or more data object units based on a predetermined time period or based on the entry point information included in the digital transport stream.

* * * * *